# United States Patent [19]

Ito

[11] Patent Number: 5,162,947
[45] Date of Patent: Nov. 10, 1992

[54] ZOOM LENS SYSTEM FOR USE WITH A COMPACT CAMERA HAVING A WIDE COVERAGE OF ANGLES

[75] Inventor: Takayuki Ito, Tokyo, Japan
[73] Assignee: Asahi Kogaku Kogyo K.K., Tokyo, Japan
[21] Appl. No.: 867,081
[22] Filed: Apr. 14, 1992

Related U.S. Application Data

[63] Continuation of Ser. No. 599,771, Oct. 18, 1990, abandoned.

[30] Foreign Application Priority Data

Oct. 19, 1989 [JP] Japan ................... 1-272392

[51] Int. Cl.$^5$ ................. G02B 15/14
[52] U.S. Cl. .................. 359/692
[58] Field of Search .......... 350/423, 427; 359/692

[56] References Cited

U.S. PATENT DOCUMENTS 4,586,793  5/1986  Tanaka et al. ............ 350/423 X
4,836,660  6/1989  Ito ..................... 359/692

FOREIGN PATENT DOCUMENTS 4030757    4/1991  Fed. Rep. of Germany .
56-128911  10/1981 Japan .
57-201213  12/1982 Japan .
60-48009    3/1985 Japan .
60-170816   9/1985 Japan .
60-191216   9/1985 Japan .
62-90611    4/1987 Japan .
62-113120   5/1987 Japan .
62-264019  11/1987 Japan .
63-276013  11/1988 Japan .
64-57222    3/1989 Japan .

Primary Examiner—Scott J. Sugarman
Attorney, Agent, or Firm—Sughrue, Mion, Zinn, Macpeak & Seas

[57] ABSTRACT

A zoom lens system for use with a compact camera is disclosed which has a wide coverage of angles and which comprises, in order from the object side, a first lens group having a positive focal length and a second lens group having a negative focal length and which performs zooming by changing the distance between the first and second lens group. The first lens group comprises, in order form the object side, a subgroup 1a having a negative focal length and a subgroup 1b having a positive focal length. The subgroup 1a is composed of at least two lens elements including a negative first lens element on the object side and a meniscus lens element on the image side which has a concave surface directed toward the object with a large curvature and a convex surface directed toward the image with a large curvature. The subgroup 1a further satisfies the following condition:

$$-0.5 < f_{1G}/f_1 \leq 0 \qquad (1)$$

where
$f_{1G}$: the focal length of the first lens group; and
$f_1$: the focal length of the first lens subgroup 1a.

10 Claims, 12 Drawing Sheets

ZOOM LENS SYSTEM FOR USE WITH A COMPACT CAMERA HAVING A WIDE COVERAGE OF ANGLES

This is a continuation of application Ser. No. 07/599,771 filed Oct. 18, 1990, now abandoned.

BACKGROUND OF THE INVENTION

The present invention relates to a zoom lens system that is suitable for use with a compact camera and which is subject to less constraints on back focus than zoom lens systems for use with single-lens reflex cameras. More particularly, the present invention relates to a compact and low-cost zoom lens system of a two-group type that has a zoom ratio of no more than about two but which has a wide coverage of angles, i.e., 36°–37° as half view angle, at the short focus end.

Conventional zoom lens systems for use with compact cameras are classified as two types, (A) a two-group type and (B) a three- or four-group type.

Compared with type (A), zoom lens systems of type (B) have the advantage of requiring relatively a small amount of lens movement but, on the other hand, they are not only large in size but also complex in construction. Because of these obvious differences from lens systems of a two-group type which are envisaged by the present invention, type (B) will not be described in detail hereinafter.

Compared to type (B), zoom lens systems of type (A) require a somewhat greater amount of lens movement but because of their simple lens configuration and mechanical structure, type (A) zoom lens systems have the advantage of ease in size reduction. Conventionally known zoom lens systems of a two-group type include version (A-1) that is described in Unexamined Published Japanese Patent Application Nos. Sho-56-128911, Sho-57-201213, Sho-60-48009, Sho-60-170816 and Sho-60-191216, version (A-2) that is described in Unexamined Published Japanese Patent Application Nos. Sho-62-90611, and Sho-64-57222, and version (A-3) that is described in Unexamined Published Japanese Patent Application Nos. Sho-62-113120 and Sho-62-264019.

In the zoom lens system of the present invention, a negative lens element is used as the first lens and Unexamined Published Japanese Patent Application No. Sho-63-276013 describes a similar telephoto zoom lens system of a two-group type in which a negative lens element is used as the first lens of the first group.

Version (A-1) has a small back focus and requires a large rear lens diameter, so it has had the problem that the overall size of the camera incorporating said lens system cannot be reduced. A further problem with this lens system is that internal reflections between the film plane and the last lens surface and other unwanted phenomena are highly likely to occur.

With a view to solving these problems, the assignee has proposed improved versions of a two-group type the back focus of which is comparatively large in consideration of its use with compact cameras. Such improved versions are (A-2) which is of a five-group-six-element composition and which is capable of a zoom ratio of 1.5–1.6 and (A-3) which is of a six-group-seven-element composition or seven-group-eight-element composition and which is capable of a zoom ratio on the order of 1.7–2.5. These versions range from a six-element composition capable of a zoom ratio of ca. 1.5–1.6 to an eight-element composition capable of a zoom ratio of at least 2. However, they provide a half view angle of only about 30° at the short focus end and are chiefly intended to photograph scenery; in other words, they are short of satisfying the need to take pictures at wide angles with a compact camera. Further, those proposals have been unable to satisfy the need for providing a zoom lens system for use with a compact camera that is even more compact and less expensive.

The zoom lens system described in Unexamined Published Japanese Patent Application No. Sho-63-276013 uses a negative lens element as the first lens as in the present invention. However, this requires the use of lenses having a certain refractive index profile which are difficult to manufacture at low cost by the state-of-the art technology.

The present invention has been accomplished in order to solve the aforementioned problems of the prior art and its principal object is to provide a zoom lens system having a wide coverage of angles that is suitable for use with a compact camera and which is basically an improvement over the version (A-2) described in Unexamined Published Japanese Patent Application No. Sho-64-57222 in that the achievable zoom ratio and the lens composition are substantially the same as in (A-2) but which has a wide coverage of angles, i.e., 36°–37° as a half view angle at the short focus end, and which yet is not only smaller in size but also less expensive on account of the expensive use of a low-refractive index glass or plastic material.

SUMMARY OF THE INVENTION

The zoom lens system of the present invention for use with a compact camera which has a wide coverage of angles comprises basically, in order from the object side, a first lens group having a positive focal length and a second lens group having a negative focal length and performs zooming by changing the distance between the first and second lens groups. In accordance with a first and broadest aspect of the present invention, said first lens group comprises, in order from the object side, a subgroup $1a$ having a negative focal length and a subgroup $1b$ having a positive focal length, said subgroup $1a$ being composed of at least two lens elements including a negative first lens element on the object side and a meniscus lens element on the image side which has a concave surface directed toward the object with a large curvature and a convex surface directed toward the image with a large curvature; said subgroup $1a$ has at least one aspheric surface that has a divergent amount of a sphericity with respect to a paraxial radius of curvature in such a way as to satisfy the following condition (2); and said subgroup $1a$ further satisfies the following condition (1):

$$-0.5 < f_{1G}/f_1 \leq 0 \quad (1)$$

$$-50 < \Sigma \Delta I_{1a} < 0. \quad (2)$$

In accordance with a second aspect of the present invention, the subgroup $1b$ in the first lens group is composed of a biconvex lens having a divergent cemented surface and a negative meniscus lens.

In accordance with a third aspect of the present invention, the zoom lens system further satisfies the following conditions:

$$0.7 < h_1/h_{1aMAX} < 1.0 \quad (3)$$

$$-0.5 < f_{1G}/f_{1a} < 0.0 \quad (4)$$
$$0.1 < d_{2-a}/f_s < 0.4. \quad (5)$$

In accordance with a fourth aspect of the present invention, either the negative first lens on the object side of the subgroup 1a or the meniscus lens on the image side or both lenses are formed of a plastic material; if the first lens is formed of a plastic material, the following condition is satisfied:

$$(m_{1a-2} \cdot m_{1b} \cdot m_{2L})^2 < 0.3; \quad (6)$$

if the meniscus lens on the image is formed of a plastic material, the following condition is satisfied:

$$(m_{1b} \cdot m_{2L} - m_{1a-2} \cdot m_{1b} \cdot m_{2L})^2 < 0.3; \quad (7)$$

if both the negative first lens on the object side and the meniscus lens on the image side are formed of a plastic material, the following condition is satisfied:

$$(m_{1b} \cdot m_{2L})^2 < 0.3, \quad (8)$$

In accordance with a fifth aspect of the present invention, the second lens group comprises, in order from the object side a positive meniscus lens 2-1 having a convex surface directed toward the image and a negative meniscus lens 2-2 having a concave surface directed toward the object, and said second lens group satisfies the following conditions:

$$N_{2G-1} < 1.65 \quad (9)$$

$$0.1 < \frac{|f_{2G}|}{f_{2G-1}} < 0.5. \quad (10)$$

In accordance with a sixth aspect of the present invention, the meniscus lens on the image side of the subgroup 1a is formed of a plastic material and lens 2-1 in the second lens group is also formed of a plastic material and satisfies the following condition:

$$(m_{2-2L} - m_{2L})^2 < 0.5. \quad (11)$$

The symbols in conditions (1)-(11) have the following respective definitions:

$f_{1G}$: the focal length of the first lens group;
$f_1$: the focal length of the first lens in subgroup 1a;
$\Sigma \Delta I_{1a}$: the total amount of changes in the coefficient of a third-order spherical aberration caused by the aspheric surfaces in subgroup 1a (i.e., an aberrational coefficient as calculated on the assumption that the focal length of the overall system at the wide-angle end is 1.0);
$h_1$: the height of intercept of the first surface in subgroup 1a by paraxial, on-axis rays;
$h_{1aMAX}$: a maximum value of the height at which paraxial, on-axis rays travel through subgroup 1a;
$f_{1a}$: the focal length of subgroup 1a;
$d_{2-a}$: the distance from the second surface of subgroup 1a to the last surface of subgroup 1a;
$f_s$: the focal length of the overall system at the wide-angle end;
$m_{1a}$: the lateral magnification of the meniscus lens on the image side of subgroup 1a;
$m_{1b}$: the lateral magnification of subgroup 1b;
$m_{2L}$: the lateral magnification of the second lens group at the narrow-angle end;

$N_{2G-1}$: the refractive index at the d-line of lens 2-1 in the second lens group;
$f_{2G}$: the focal length of the second lens group;
$f_{2G-1}$: the focal length of lens 2-1 in the second lens group; and
$m_{2-2L}$: the lateral magnification of lens 2-2 in the second lens group at the narrow-angle end.

The first lens in the conventional two-group type zoom lens systems for use with a compact camera has been a positive lens in almost 1a cases. In contrast, the telephoto type, two-group zoom lens system of the present invention is essentially characterized by using a negative lens (including one having power zero) as the first lens in order to cover a wide angle at the short focus end while insuring a comparatively long back focus.

In the zoom lens system described in Unexamined Published Japanese Patent Application No. Sho-63-276013 which employs a negative lens as the first lens, the first lens group is composed of a lens having a negative refractive index profile and a lens having a positive refractive index profile. When this zoom lens system is compared t the system of the present invention, the lens having a negative refractive index profile may be considered to correspond to the negative subgroup 1a which is composed of at least two leans elements whereas the lens having a positive refractive index profile corresponds to positive subgroup 1b which is also composed of at least two lens elements.

In the present invention, it is essential for the purpose of achieving a wide coverage of angles that the meniscus lens on the image side of subgroup 1a have a concave surface of a large curvature directed toward the object and convex surface of a large curvature directed toward the image (especially because condition (3) can be easily satisfied).

To further increase the zoom ratio that can be achieved, the meniscus lens on the image side of subgroup 1a is preferably divided into two lens elements, one being negative and the other being positive.

DETAILED DESCRIPTION OF THE CONDITIONS

Figure 1:
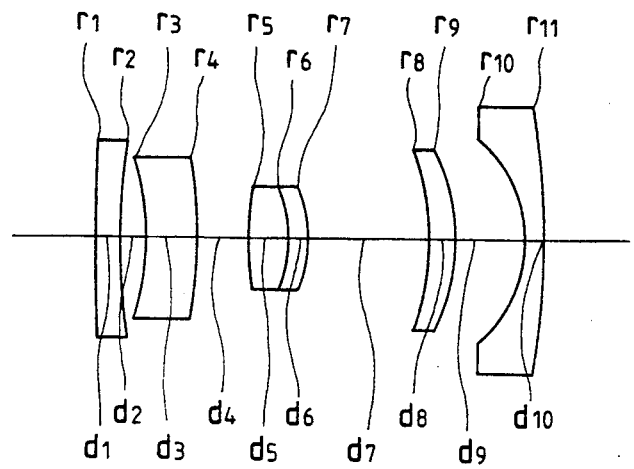
FIGS. 1, 3, 5, 7, 9 and 11 are simplified cross-sectional views of the lens systems of Examples 1, 2, 3, 4, 5 and 6, respectively, at the wide-angle end.
Figure 2A:
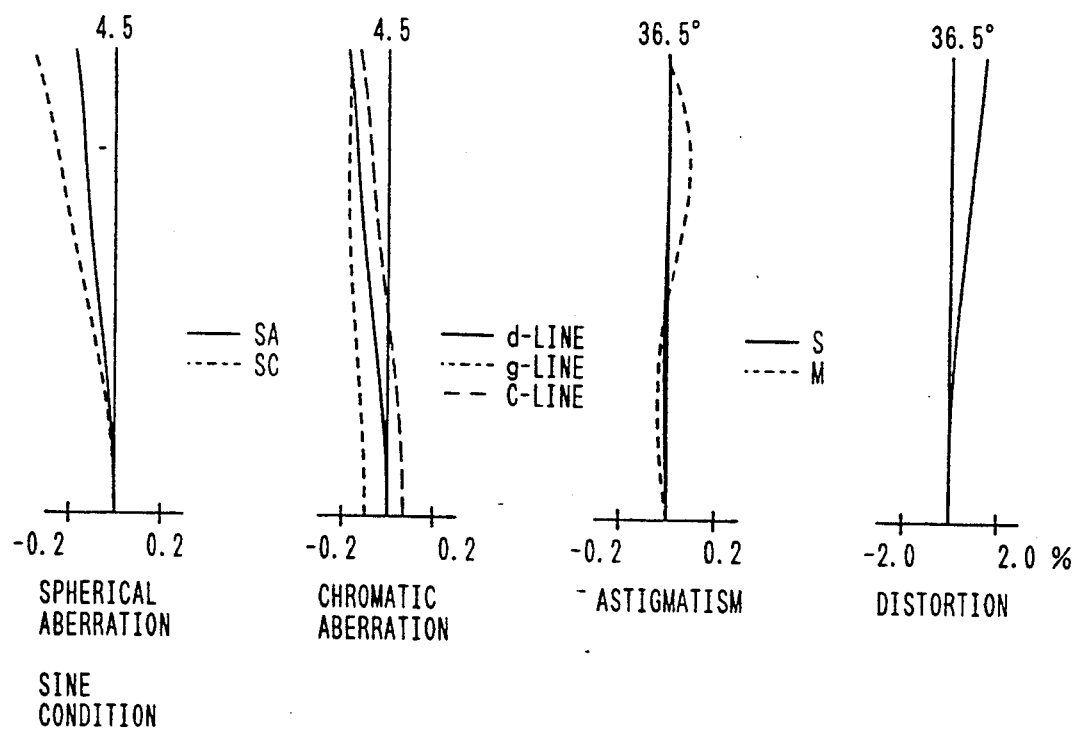
FIGS. 2, 4, 6, 8, 10 and 12 are graphs plotting the aberration curves obtained with the lens systems of Examples 1, 2, 3, 4, 5 and 6, respectively, with (a) showing the state at the wide-angle end, (b), the middle-angle end, and (c), the narrow-angle end.
Figure 2B:
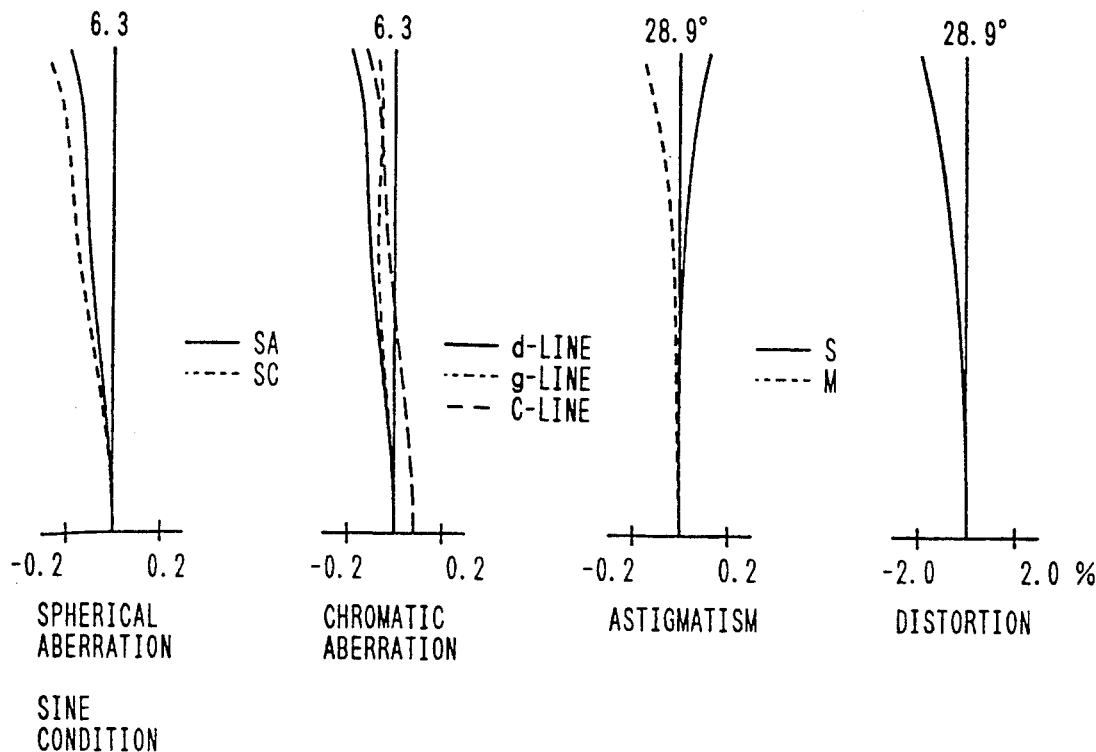
Figure 2C:
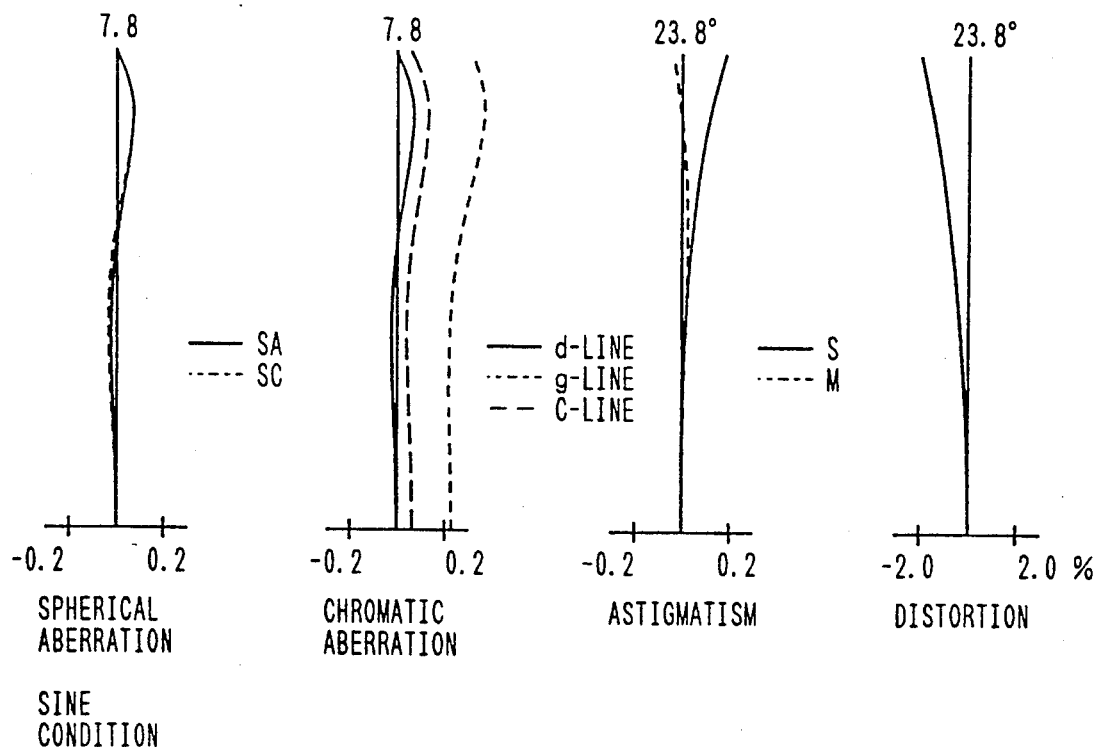
Figure 3:
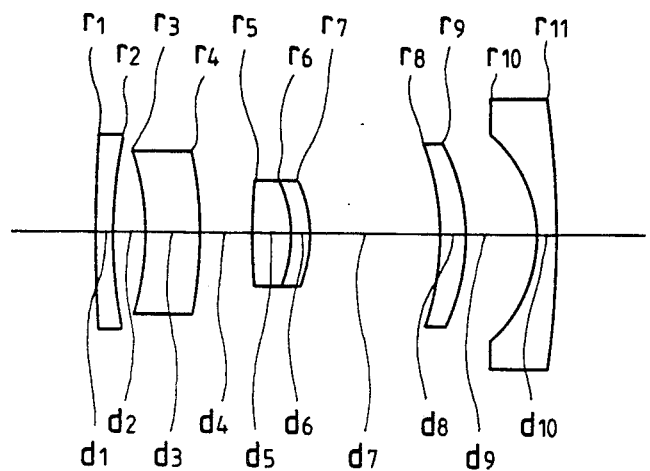
Figure 4A:
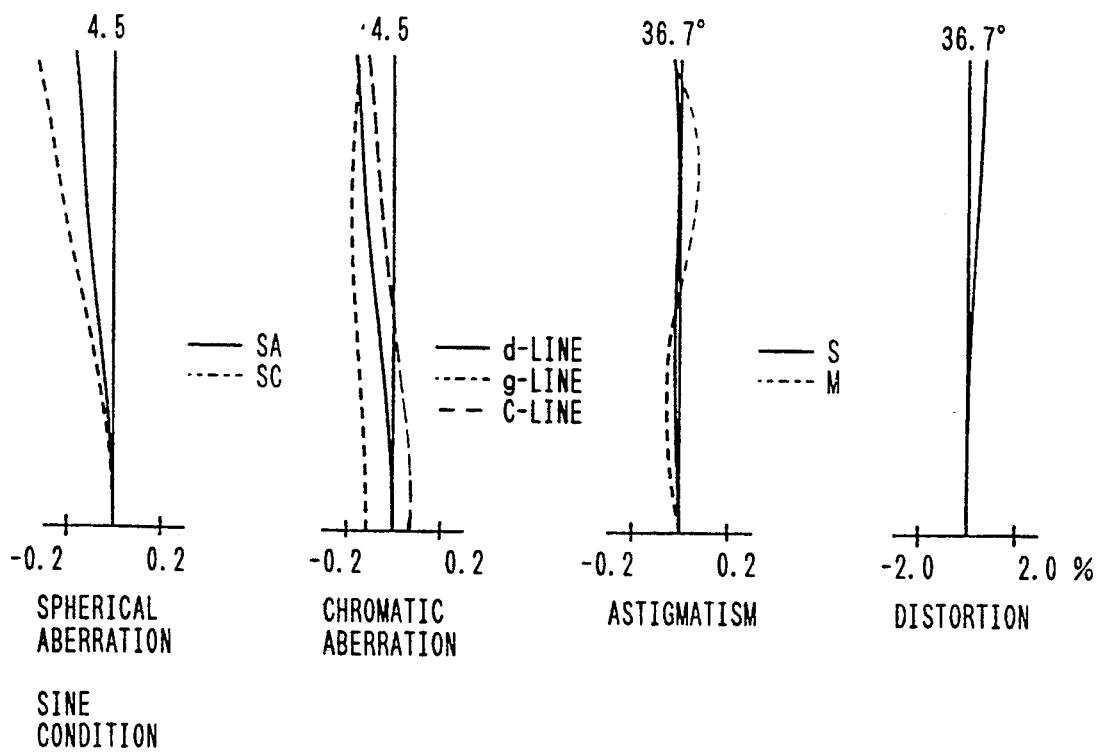
Figure 4B:
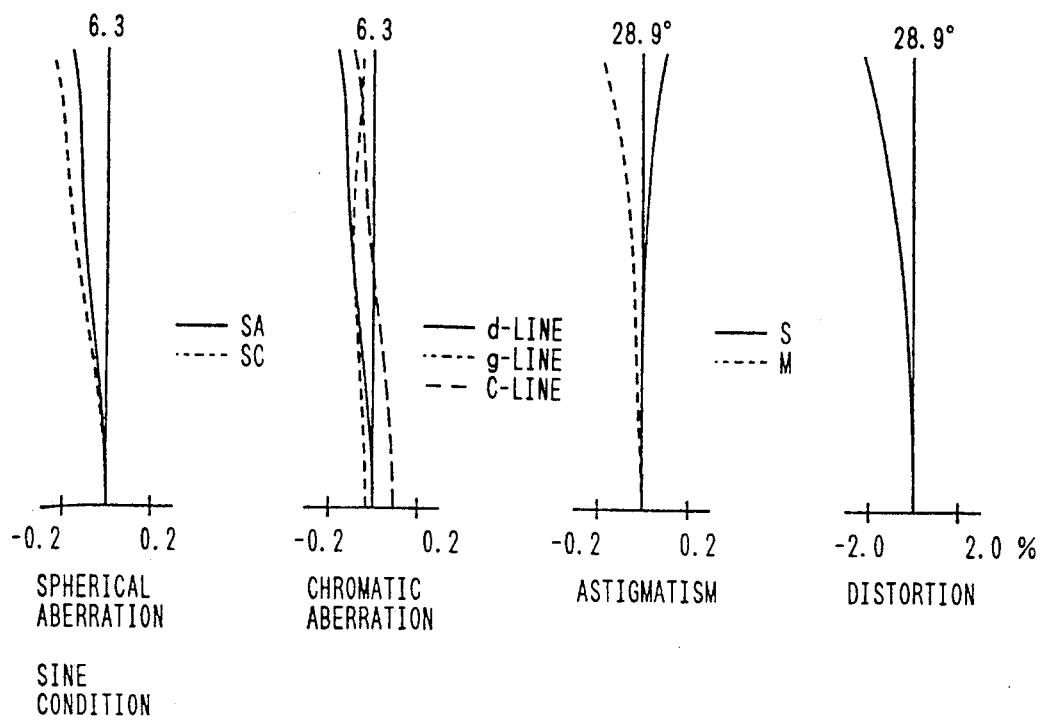
Figure 4C:
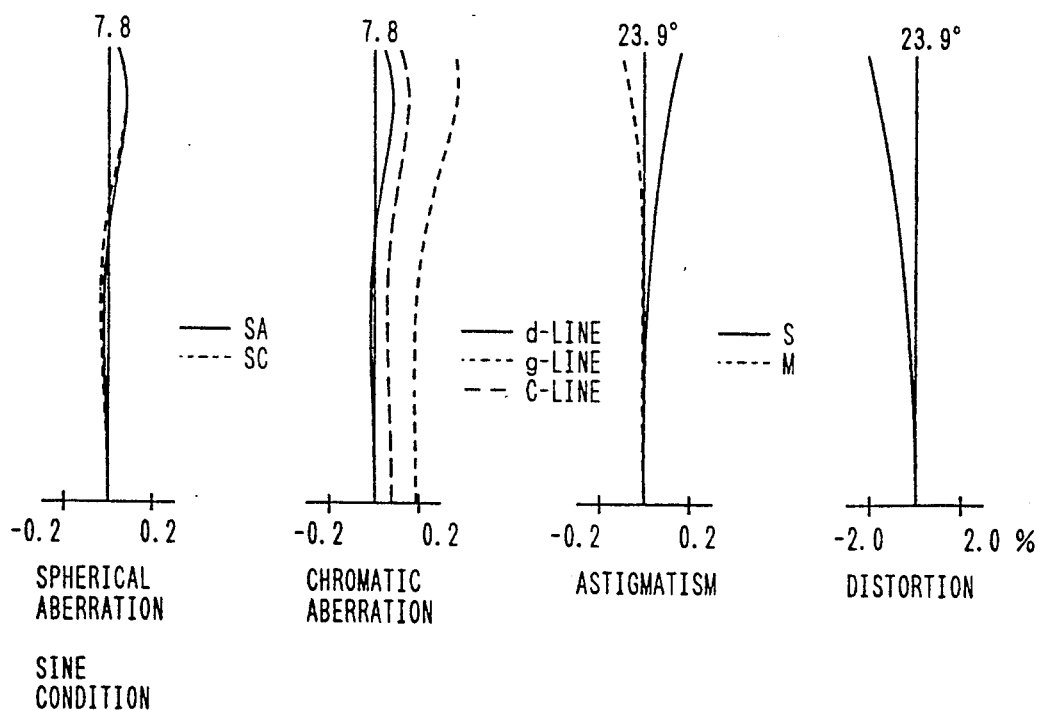
Figure 5:
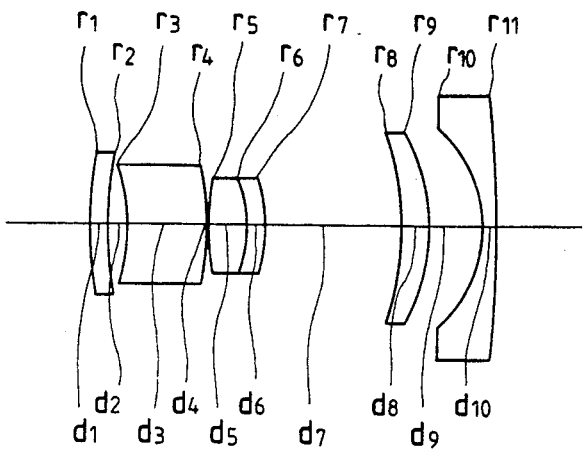
Figure 6A:
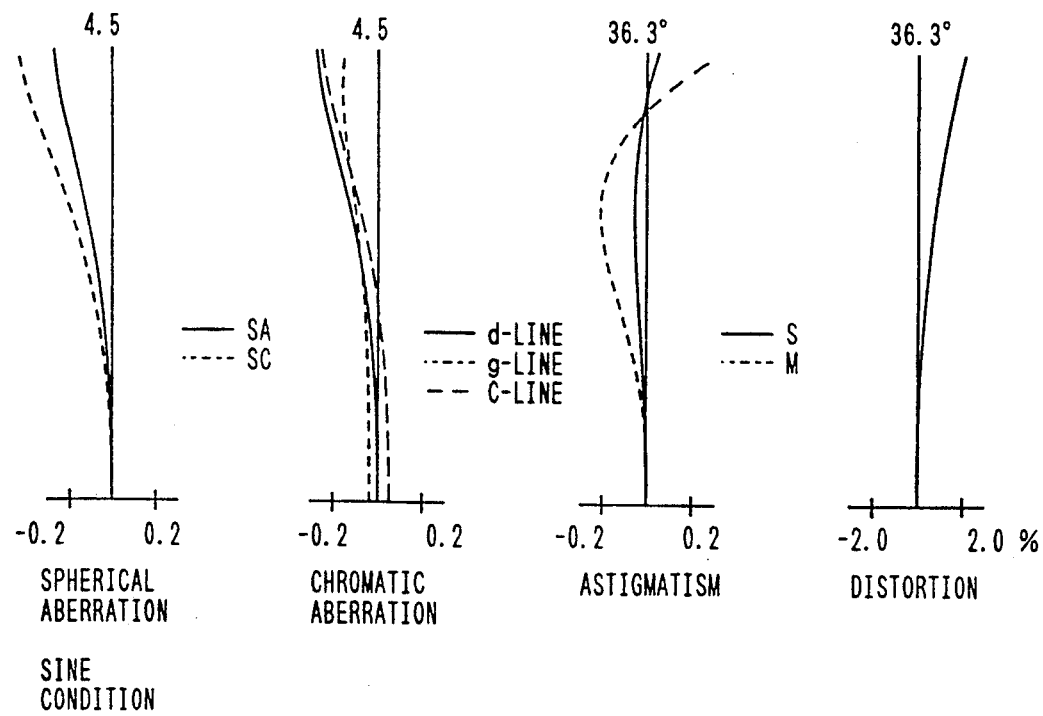
Figure 6B:
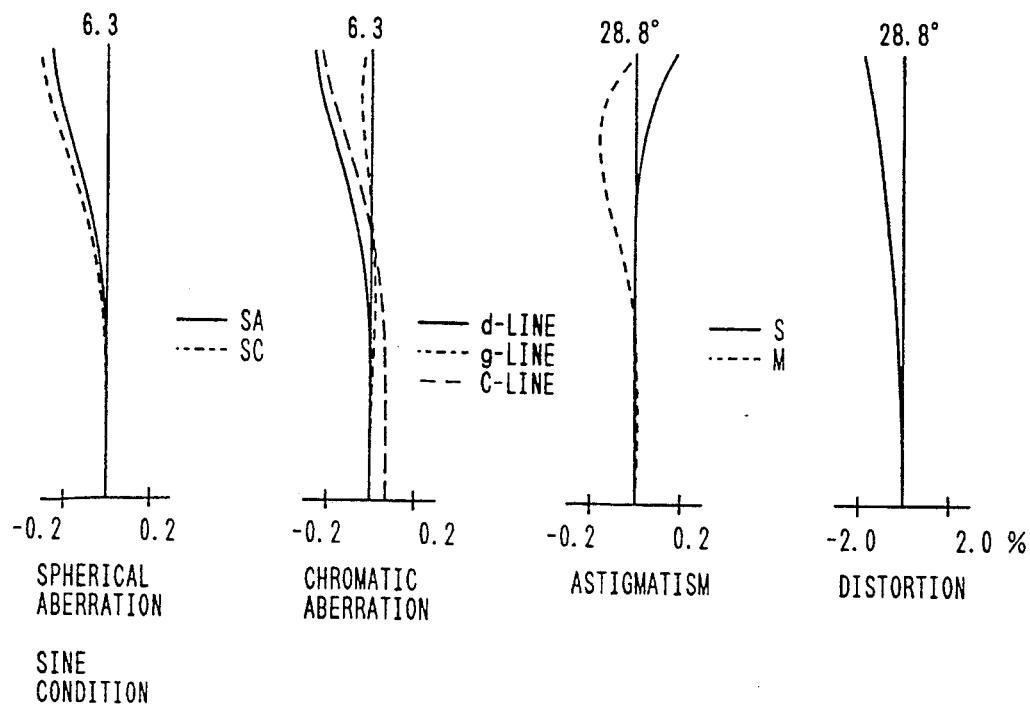
Figure 6C:
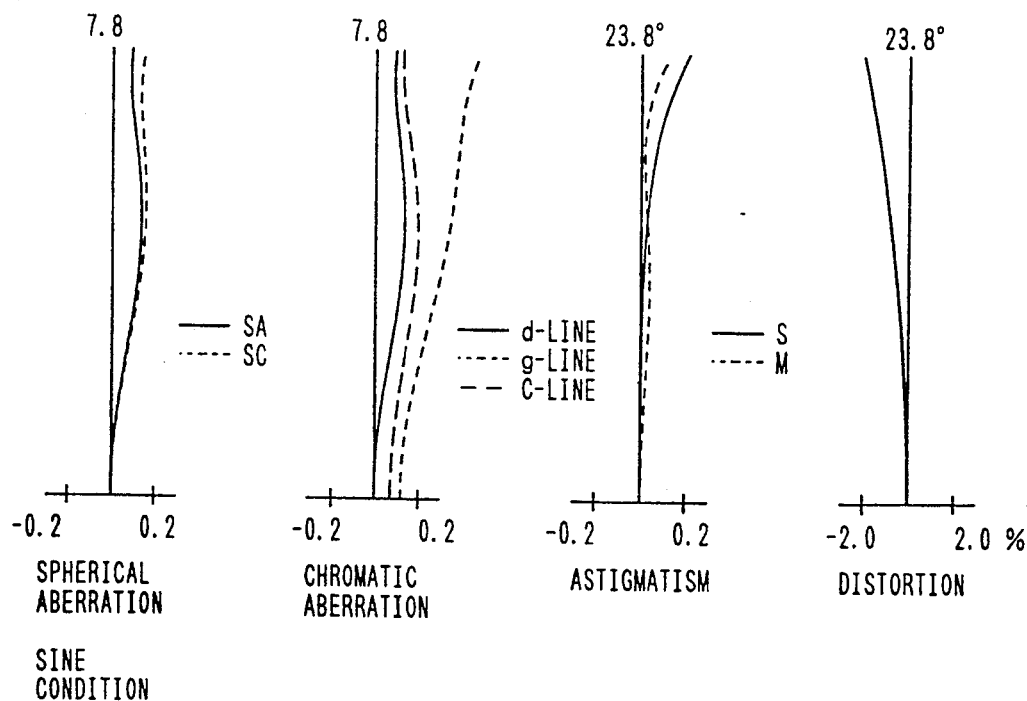
Figure 7:
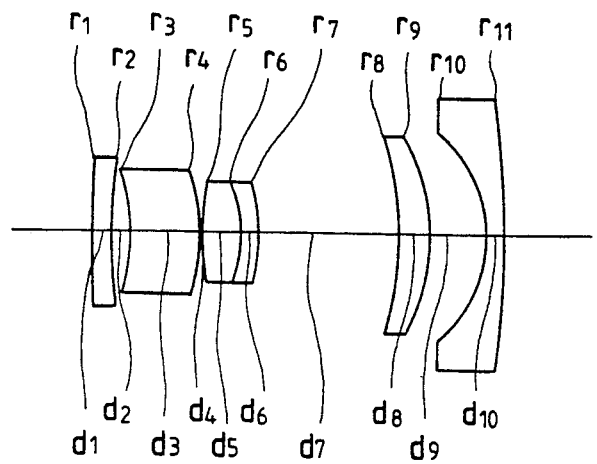
Figure 8A:
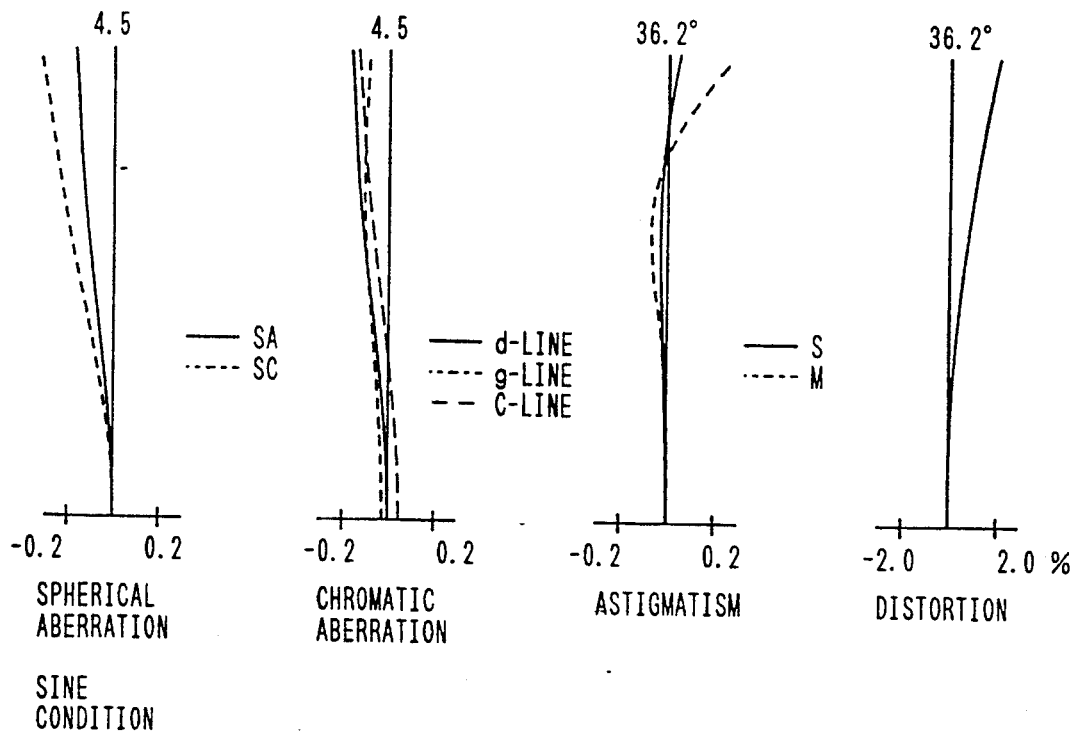
Figure 8B:
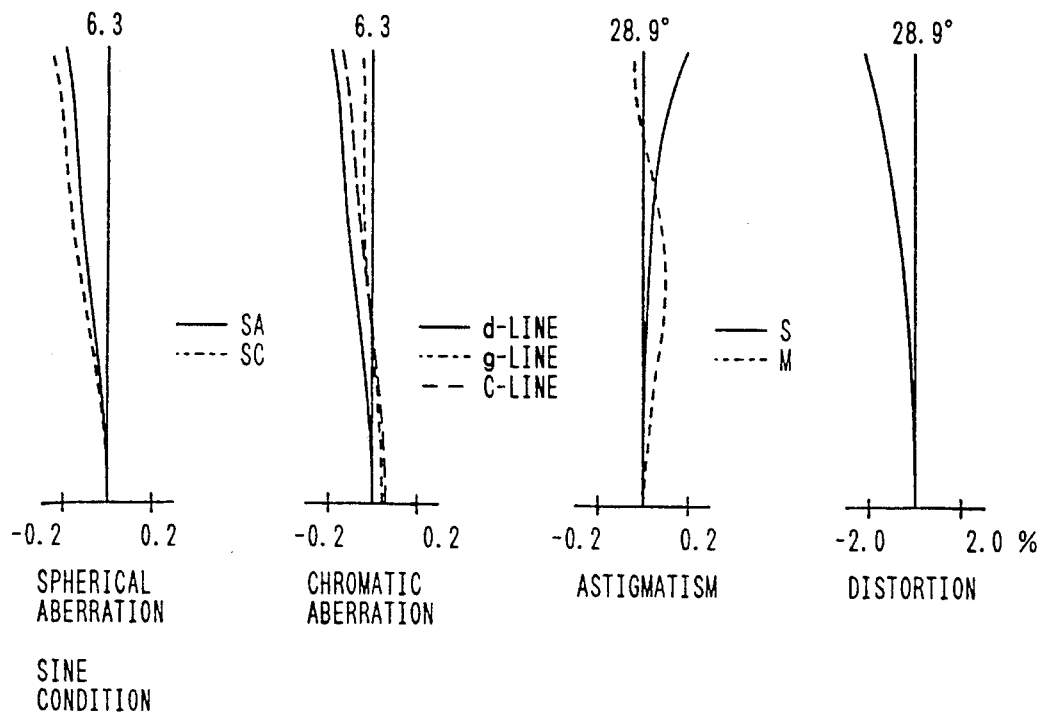
Figure 8C:
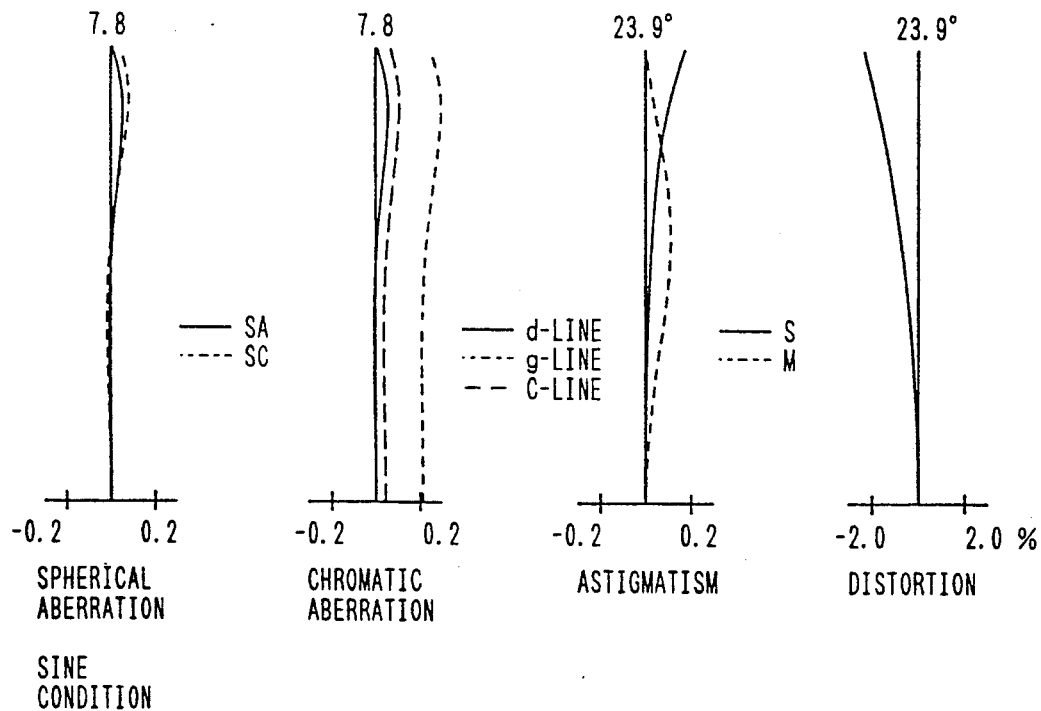
Figure 9:
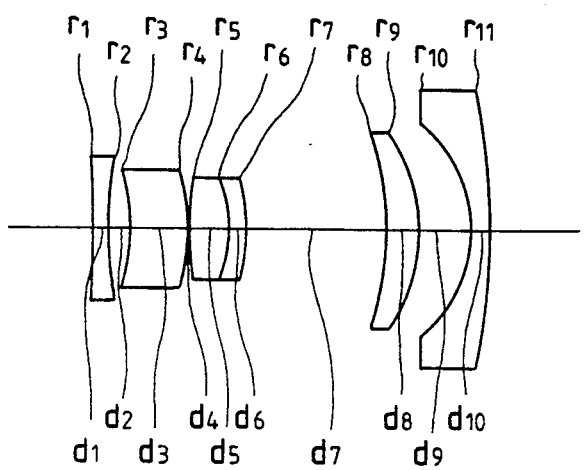
Figure 10A:
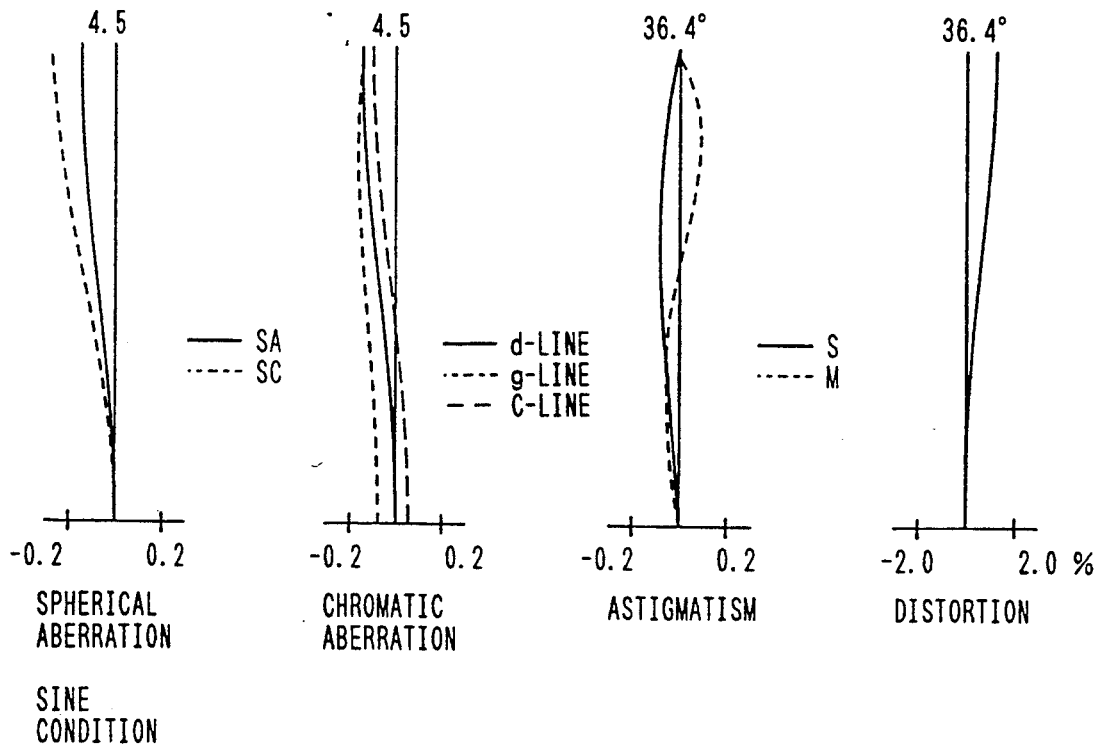
Figure 10B:
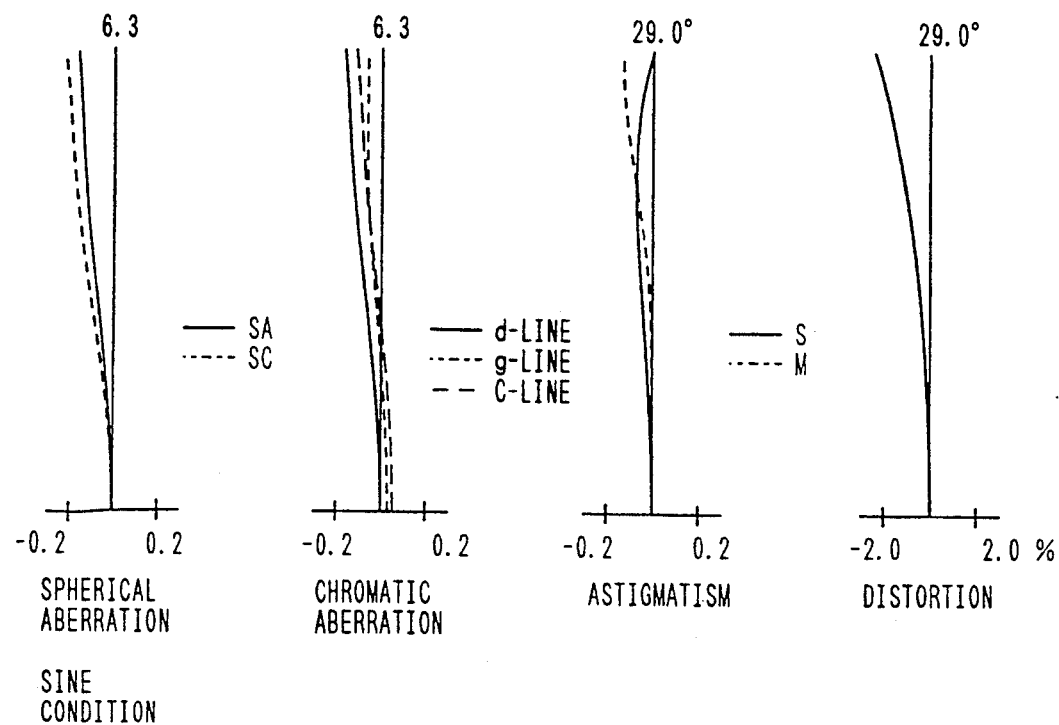
Figure 10C:
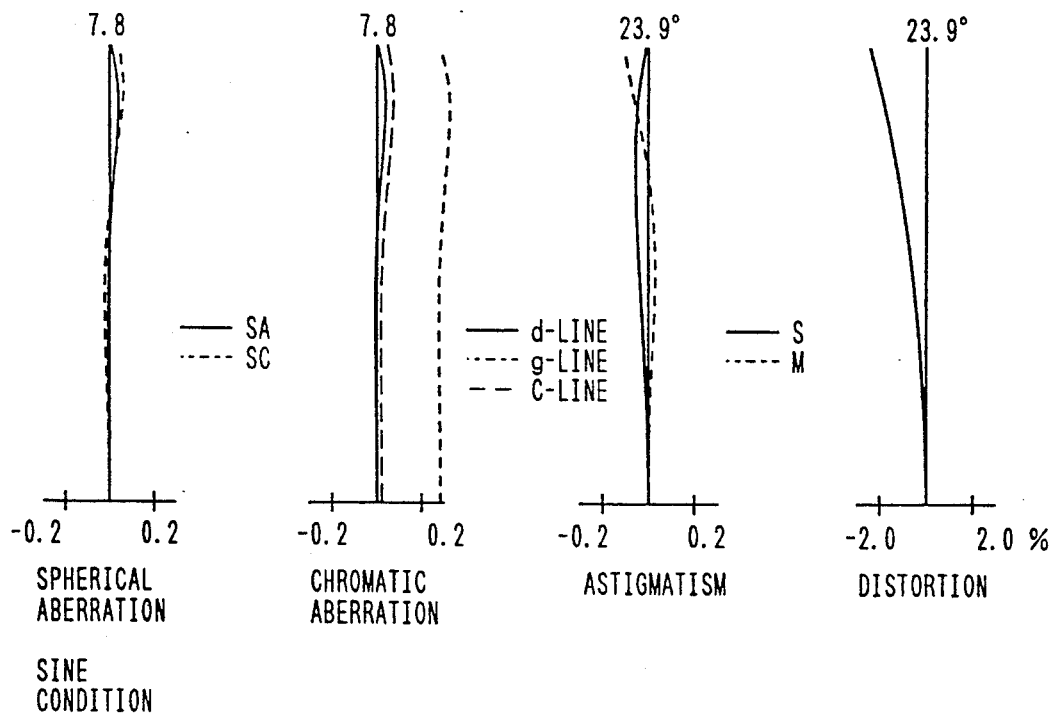
Figure 11:
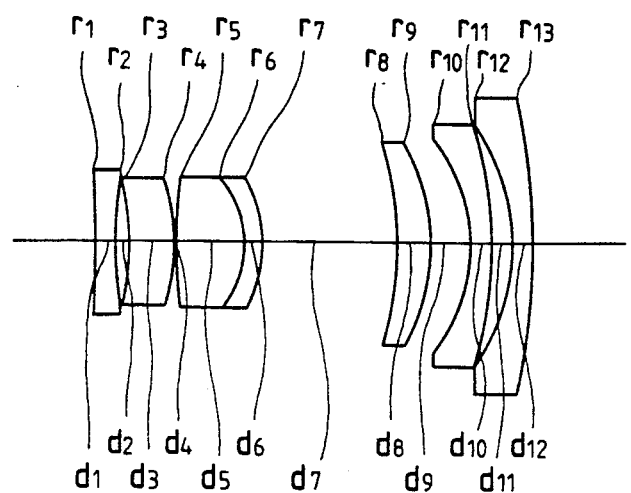
Figure 12A:
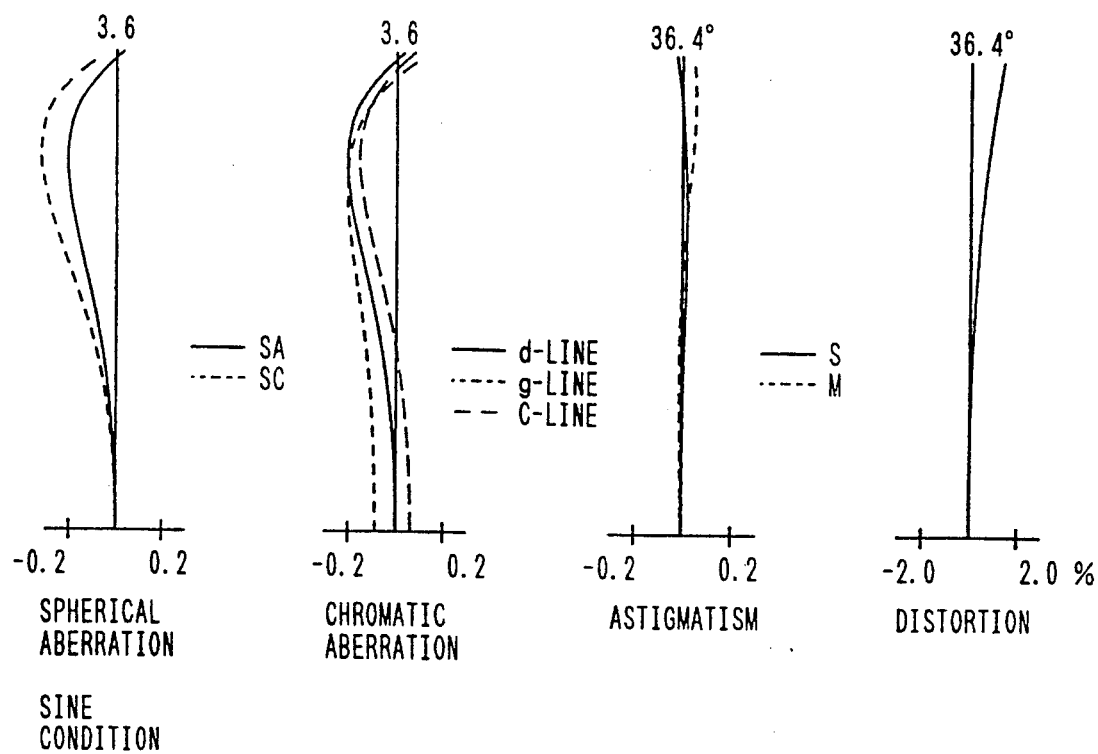
Figure 12B:
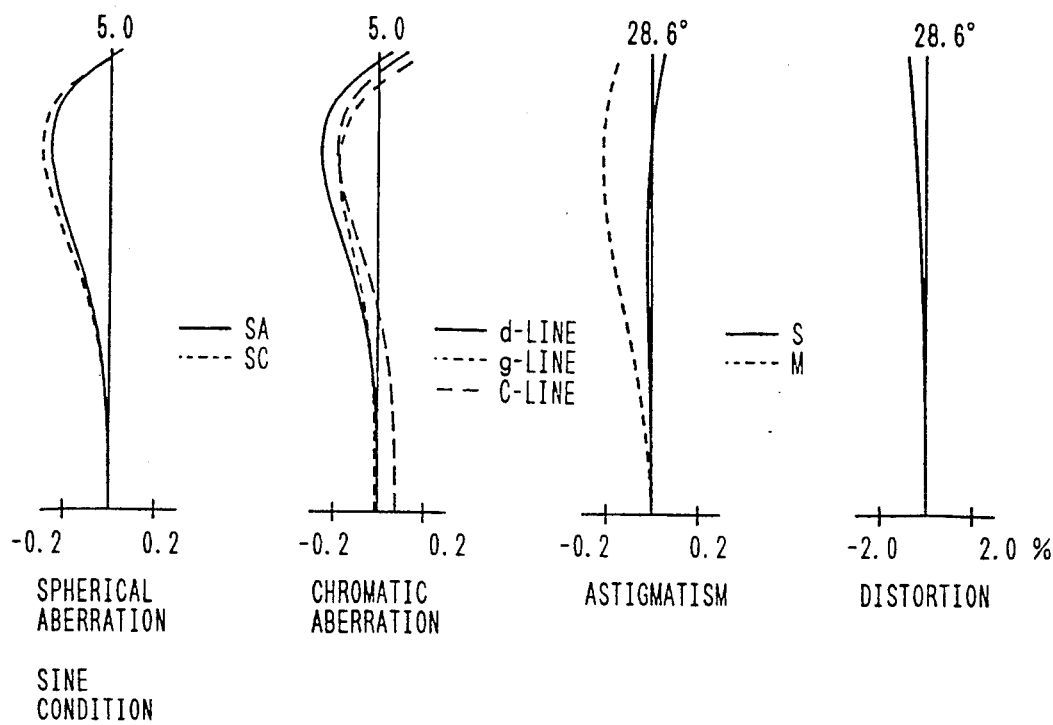
Figure 12C:
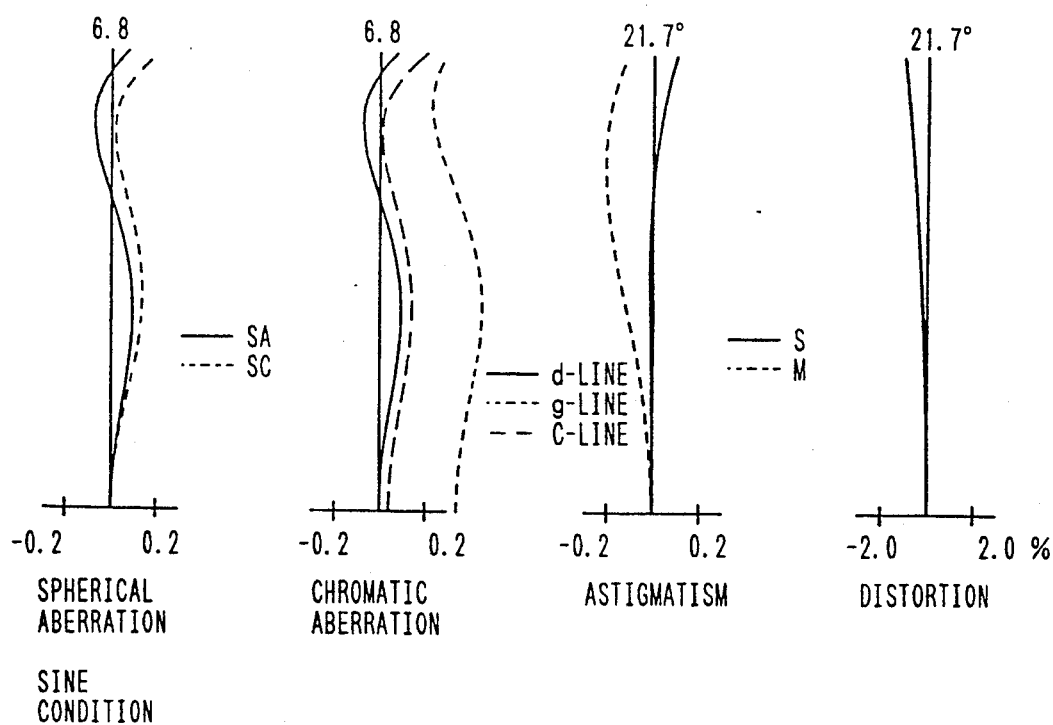

The zoom lens system of the present invention has a comparatively long back focus and insures a wide range of angles at the short focus end in consideration of its use with a compact camera. The overall length of this lens system is significantly reduced and yet efficient compensation for aberrations can be achieved by using inexpensive glass and plastic materials as well as aspheric lens surfaces.

Condition (1) relates t the power of the first lens which is the most characteristic part of the zoom lens system of the present invention. If the upper limit of this condition is exceeded, the first lens will not have a negative focal length and hence is unable to insure a wide coverage of angles at the short focus end. If the lower limit of condition (1) is not reached, the first lens will have an unduly large negative power. Since the overall power of the first lens group is positive, the burden on the positive subgroup 2b becomes excessive and the resulting higher-order aberrations are too extensive to be efficiently compensated within the first lens group. The second lens group which is a magnifying lens will simply amplify the aberrations that occur in the first lens group.

Condition (2) relates to the aspheric surface in subgroup 1a. By using an aspheric surface having a divergent amount of asphericity with respect to a paraxial radius of curvature, not only is it possible to achieve effective compensation for spherical aberration within the first lens group but also the amount of change in spherical aberration that occurs during zooming can be reduced. The term "divergent" means that the radius of curvature decreases as the diameter of a concave surface increases whereas it increases as the diameter of a convex surface increases. The upper limit of condition (1) is equal to or smaller than zero and the case where it is equal to zero (i.e., power zero) is equivalent to saying that the subgroup 1a has a negative power in the presence of a divergent amount of sphericity that satisfies condition (2). If the upper limit of condition (2) is exceeded, the aspheric surface is not sufficiently effective in achieving satisfactory compensation for aberrations. If the lower limit of this condition is not reached, overcompensation will result to cause higher-order aberrations.

It is necessary here to add supplemental comments on the amount of change in the coefficient of a third-order aberration caused by an aspheric surface. The shape of an aspheric surface is generally expressed by the following equation:

$$x = \frac{cy^2}{1 + \sqrt{1 - c^2y^2}} + a_4y^4 + a_6y^6 + a_8y^8 + a_{10}y^{10} + \ldots$$

In the case where the focal length, f, is 1.0, or if $X = x/f$, $Y = y/f$, $C = fc$, $A_4 = F^3a_4$, $A_6 = F^5a_6$, $A_8 = F^7a_8$ and $A_{10} = F^9a_{10}$ are substituted into said equation, the result is:

$$X = \frac{CY^2}{1 + \sqrt{1 - C^2Y^2}} + A_4Y^4 + A_6Y^6 + A_8Y^8 + A_{10}Y^{10} + \ldots$$

The second and subsequent terms of this equation give the amount of aspheric surface and the coefficient $A_4$ in the second term has the following relationship with the coefficient of a third-order sphericity $\phi$:

$$\phi = 8(N' - N)A_4$$

where N is the refractive index of a lens surface before it is made aspheric and N' is the refractive index of the same surface after it is rendered aspheric.

The coefficient of a third-order sphericity introduces the following amounts of change in the coefficients of various third-order aberrations considered in the theory of aberrations:

$$\Delta I = h^4\phi$$

$$\Delta II = h^3\bar{h}\phi$$

$$\Delta III = h^2\bar{h}^2\phi$$

$$\Delta IV = h^2\bar{h}^2\phi$$

$$\Delta V = h\bar{h}^3\phi$$

where
I: the coefficient of spherical aberration;
II: the coefficient of coma;
III: the coefficient of astigmatism;
IV: the coefficient of truncated spherical field curvature;
V: the coefficient of distortion;
h: the height of intercept of each lens surface by paraxial, on-axis rays; and
$\bar{h}$: the height of intercept of each lens surface by paraxial, off-axis rays passing through the center of the pupil.

The shape of an aspheric surface may be expressed in various other ways using conicity coefficients or odd-numbered order terms and satisfactory approximation can be made using only odd-numbered order terms if y is smaller than a paraxial radius of curvature. Hence, it should be noted that one cannot depart from the scope of the present invention merely by using equations for the shape of an aspheric surface that are different from the one described above.

Conditions (3), (4) and (5) all relate to subgroup 1a in the first lens group. As already mentioned, the zoom lens system of the present invention is basically a telephoto, two-group type, in which the first lens group is of a retrofocus type having a negative lens on the object side. Condition (3) specifies the ratio of the height of intercept of the first lens surface by paraxial, on-axis rays to a maximum value of the height at which paraxial, on-axis rays travel through subgroup 1a. Condition (4) sets forth the requirement that should be satisfied by the power of subgroup 1a.

If the upper limit of either condition (3) or (4) is exceeded, the first lens group will not be of a retrofocus type and it is difficult to attain a wide coverage of angles at the short focus end. The result is also unfavorable for the purpose of increasing the back focus. If, on the other hand, the lower limit of either condition (3) or (4) is not reached, the negative power of subgroup 1a will become unduly great. Since the overall power of the first lens group is positive, the burden on the positive subgroup 1b will increase so much that it becomes difficult to compensate for the aberrations that occur within the first lens group.

Condition (5) which sets forth the requirement that should be satisfied by the distance from the divergent second surface of the first lens to the last surface of subgroup 1a is also correlated to conditions (3) and (4). If the upper limit of condition (5) is exceeded, the result is favorable for the purpose of effective compensation for aberrations since conditions (3) and (4) can be easily satisfied. However, the overall length and weight of the lens system will increase and the object of realizing a compact and lightweight system cannot be achieved. If the lower limit of condition (5) is not reached, the possibility that the lower limit of either condition (3) or (4) is not reached will increase when one attempts to realize the first lens group of retrofocus type and problems of the kind already mentioned above will occur.

Another feature of the present invention is that if lenses of a comparatively small power in each for the first and second lens groups is made of a plastic material, the amount of defocusing or deterioration in lens performance is small despite possible changes in temperature or humidity. In addition, the overall weight of the lens system can be reduced. Further, it is easy to make an aspheric surface of plastic lenses and this contributes to an improvement in lens performance.

Supplemental comments are also necessary on the amount of defocusing with plastic lenses that can occur in response to changes in temperature or humidity. Plastics will experience temperature- or humidity-dependent changes in linear expansion coefficient of refractive index that are at least about 10 times as great as ordinary glass materials. If the amount of change in the focal length of a plastic lens is written as $\Delta f$, the amount of defocusing $\Delta p$ can be expressed by:

$$\Delta p = \Delta f(m' - m)^2$$

where m' is the lateral magnification of the lens groups exclusive of and subsequent to the plastic lens, and m is the lateral magnification of the combination of the plastic lens and subsequent lens groups.

Thus, in the case where the negative first lens in subgroup 1a is made of a plastic material, $m' = m_{1a-2} \cdot m_{1b} \cdot m_{2L}$ and $m=0$ and the amount of defocusing in response to changes in temperature or humidity will become undesirable large if condition (6) is not met.

In the case where the meniscus lens on the image side of subgroup 1a is made of a plastic material, $m' = m_{1b} \cdot m_{2L}$ and $m = m_{1a-2} m_{1b} \cdot m_{2L}$ and the amount of defocusing in response to changes in temperature or humidity will become undesirable large if condition (7) is not met.

If subgroup 1a is composed of a negative lens and a positive meniscus lens, both of them are preferably formed of a plastic material since the amounts of defocusing with the two lenses are opposite in sign and cancel each other. In this case, $m' = m_{1b} \cdot m_{2L}$ and $m=0$ and the amount of defocusing in response to changes in temperature or humidity will become undesirable large if condition (8) is not met. From the viewpoint of minimizing adverse effects such as the deformation of plastic materials, it is desirable that conditions (6) and (7) are also satisfied. It should, however, be noted that if the first lens in subgroup 1a is to be formed of a plastic material, it is preferably protected with a coating or filter from surface flaws and other defects that impair the appearance of the lens The foregoing description concerns the first lens group but it should be noted that lenses in the second group may also be formed of glass or plastic materials that have low indices of refraction. Conditions (9) and (10) relate to positive meniscus lens 2-1 on the object side of the second lens group. If condition (9) is not met, an inexpensive zoom lens system which is one of the objects of the present invention cannot be realized. If condition (10) is not met, the power of lens 2-1 becomes so strong that if it is made of a plastic material as described just below, the amount of defocusing or deterioration in lens performance in response to changes in temperature or humidity will become undesirable large. If condition (1) is not met, the positive power of lens 2-1 becomes so small as to introduce difficulty in compensating for chromatic aberration that may occur within the second lens group.

If positive meniscus lens 2-1 is to be made of a plastic material, it is preferred that the negative lens (second lens) in subgroup 1a is also made of a plastic material. If condition (11) is not met, the amount of defocusing in response to changes in temperature or humidity will become undesirable large.

EXAMPLES

Examples 1-6 of the present invention are described below with reference to data sheets, wherein f denotes the focal length, $\omega$, half view angle $f_B$, back focus, r, the radius of curvature of an individual lens surface, d, the thickness of an individual lens or the aerial distance between adjacent lens surfaces, N, the refractive index of an individual lens at the d-line, and $\nu$, the Abbe number of an individual lens. In the following data sheets, $\alpha_4$, $\alpha_6$ and $\alpha_8$ signify the four-, six- and eight-order coefficients of sphericity.

EXAMPLE 1

$F_{NO} = 1:4.5-6.3-7.8$  $f = 28.8-40.0-50.0$
$\omega = 36.5-28.9-23.8$  $f_B = 9.52-21.82-32.80$

| Surface No. | r | d | N | $\nu$ |
|---|---|---|---|---|
| 1 | −1155.862 | 2.00 | 1.50137 | 56.4 |
| 2 | 44.414 | 1.83 | | |
| 3* | −20.974 | 4.16 | 1.49186 | 57.4 |
| 4* | −24.155 | 3.83 | | |
| 5 | 28.793 | 3.18 | 1.49831 | 65.0 |
| 6 | −8.263 | 1.30 | 1.80518 | 25.4 |
| 7 | −11.036 | 9.60-5.44-3.30 | | |
| 8* | −19.003 | 2.24 | 1.58547 | 29.9 |
| 9 | −13.790 | 5.22 | | |
| 10 | −9.774 | 1.40 | 1.71700 | 47.9 |
| 11 | −62.017 | | | |

Third aspheric surface
$\alpha_4 = -0.13199124 \times 10^{-3}$
$\alpha_6 = 0.33020762 \times 10^{-5}$
$\alpha_8 = -0.20227944 \times 10^{-7}$ Fourth aspheric surface
$\alpha_4 = 0.66251988 \times 10^{-4}$
$\alpha_6 = 0.43519870 \times 10^{-5}$
$\alpha_8 = -0.19786341 \times 10^{-7}$ Eighth aspheric surface
$\alpha_4 = 0.19537588 \times 10^{-4}$
$\alpha_6 = -0.27364726 \times 10^{-6}$
$\alpha_8 = 0.68890548 \times 10^{-8}$

EXAMPLE 2

$F_{NO} = 1:4.5-6.3-7.8$  $f = 28.8-40.0-50.0$
$\omega = 36.7-28.9-23.9$  $f_B = 9.96-22.51-33.78$

| Surface No. | r | d | N | $\nu$ |
|---|---|---|---|---|
| 1 | 112.851 | 1.25 | 1.51633 | 64.1 |
| 2 | 28.043 | 2.45 | | |
| 3* | −21.667 | 4.35 | 1.49186 | 57.4 |
| 4* | −23.688 | 3.77 | | |
| 5 | 31.551 | 3.25 | 1.49831 | 65.0 |
| 6 | −8.000 | 1.30 | 1.80518 | 25.4 |
| 7 | −10.707 | 9.70-5.49-3.31 | | |
| 8* | −19.000 | 2.19 | 1.58547 | 29.9 |
| 9 | −13.771 | 5.28 | | |
| 10 | −9.974 | 1.40 | 1.71700 | 47.9 |
| 11 | −65.191 | | | |

Third aspheric surface
$\alpha_4 = -0.16196547 \times 10^{-3}$
$\alpha_6 = 0.33966042 \times 10^{-5}$
$\alpha_8 = -0.17979629 \times 10^{-7}$ Fourth aspheric surface
$\alpha_4 = 0.55028021 \times 10^{-4}$
$\alpha_6 = 0.42858951 \times 10^{-5}$
$\alpha_8 = -0.94133470 \times 10^{-8}$ Eighth aspheric surface
$\alpha_4 = 0.16193380 \times 10^{-4}$
$\alpha_6 = -0.31705545 \times 10^{-6}$
$\alpha_8 = 0.65675921 \times 10^{-8}$

EXAMPLE 3

$F_{NO} = 1:4.5-6.3-7.8$  $f = 28.9-40.0-50.0$
$\omega = 36.3-28.8-23.8$  $f_B = 9.54-23.00-35.09$

| Surface No. | r | d | N | $\nu$ |
|---|---|---|---|---|

EXAMPLE 3-continued

| $F_{NO}$ = 1:4.5–6.3–7.8 | | f = 28.9–40.0–50.0 | | |
|---|---|---|---|---|
| ω = 36.3–28.8–23.8 | | $f_B$ = 9.54–23.00–35.09 | | |
| 1 | 32.610 | 1.40 | 1.49186 | 57.4 |
| 2* | 32.148 | 1.53 | | |
| 3 | −15.741 | 6.50 | 1.69350 | 53.2 |
| 4 | −25.191 | 0.20 | | |
| 5 | 30.247 | 3.08 | 1.56883 | 56.3 |
| 6 | −8.589 | 1.30 | 1.80518 | 25.4 |
| 7 | −13.414 | 11.00–5.90–3.26 | | |
| 8 | −23.303 | 2.36 | 1.80518 | 25.4 |
| 9 | −15.670 | 4.15 | | |
| 10 | −11.281 | 1.40 | 1.78590 | 44.2 |
| 11 | −92.130 | | | |

Second aspheric surface
$a_4 = 0.13465738 \times 10^{-3}$
$a_6 = -0.91656704 \times 10^{-6}$
$a_8 = 0.93247586 \times 10^{-7}$

EXAMPLE 4

| $F_{NO}$ = 1:4.5–6.3–7.8 | | f = 28.9–40.0–50.0 | | |
|---|---|---|---|---|
| ω = 36.2–28.9–23.9 | | $f_B$ = 9.60–23.00–35.10 | | |
| Surface No. | r | d | N | v |
| 1 | 380.713 | 1.40 | 1.49186 | 57.4 |
| 2* | 48.823 | 1.43 | | |
| 3 | −15.135 | 5.52 | 1.49186 | 57.4 |
| 4* | −16.582 | 0.20 | | |
| 5 | 27.684 | 3.04 | 1.51633 | 64.1 |
| 6 | −9.347 | 1.30 | 1.80518 | 25.4 |
| 7 | −13.603 | 11.00–5.91–3.26 | | |
| 8 | −22.373 | 2.43 | 1.80518 | 25.4 |
| 9 | −14.854 | 4.14 | | |
| 10 | −10.842 | 1.40 | 1.80610 | 40.9 |
| 11 | −71.900 | | | |

Second aspheric surface
$a_4 = 0.21730709 \times 10^{-3}$
$a_6 = -0.98794356 \times 10^{-6}$
$a_8 = 0.13733039 \times 10^{-6}$ Fourth aspheric surface
$a_4 = -0.50524256 \times 10^{-4}$
$a_6 = 0.12890886 \times 10^{-5}$
$a_8 = -0.50335244 \times 10^{-7}$

EXAMPLE 5

| $F_{NO}$ = 1:4.5–6.3–7.8 | | f = 29.0–40.0–50.0 | | |
|---|---|---|---|---|
| ω = 36.4–29.0–23.9 | | $f_B$ = 9.70–22.89–34.88 | | |
| Surface No. | r | d | N | v |
| 1 | −74.523 | 1.30 | 1.49186 | 57.4 |
| 2* | 81.780 | 1.49 | | |
| 3 | −16.509 | 4.50 | 1.49186 | 57.4 |
| 4* | −16.696 | 0.18 | | |
| 5 | 29.958 | 3.04 | 1.51633 | 64.1 |
| 6 | −9.060 | 1.30 | 1.80518 | 25.4 |
| 7 | −12.538 | 10.61–5.81–3.27 | | |
| 8* | −20.254 | 2.56 | 1.58547 | 29.9 |
| 9 | −13.083 | 4.06 | | |
| 10 | −9.993 | 1.40 | 1.74400 | 44.8 |

EXAMPLE 5-continued

| $F_{NO}$ = 1:4.5–6.3–7.8 | | f = 29.0–40.0–50.0 | | |
|---|---|---|---|---|
| ω = 36.4–29.0–23.9 | | $f_B$ = 9.70–22.89–34.88 | | |
| 11 | −54.034 | | | |

Second aspheric surface
$a_4 = 0.26099530 \times 10^{-3}$
$a_6 = -0.13475431 \times 10^{-5}$
$a_8 = 0.15814110 \times 10^{-6}$ Fourth aspheric surface
$a_4 = -0.51010293 \times 10^{-4}$
$a_6 = 0.15071552 \times 10^{-5}$
$a_8 = -0.52968803 \times 10^{-7}$ Eighth aspheric surface
$a_4 = 0.14960324 \times 10^{-4}$
$a_6 = -0.32608025 \times 10^{-6}$
$a_8 = 0.69066771 \times 10^{-8}$

EXAMPLE 6

| $F_{NO}$ = 1:3.6–5.0–6.8 | | f = 28.9–40.0–50.0 | | |
|---|---|---|---|---|
| ω = 36.4–28.6–21.7 | | $f_B$ = 8.38–20.22–36.20 | | |
| Surface No. | r | d | N | v |
| 1 | −82.758 | 1.50 | 1.73101 | 40.3 |
| 2* | 79.204 | 1.13 | | |
| 3 | −17.282 | 3.28 | 1.80610 | 40.9 |
| 4 | −17.854 | 0.12 | | |
| 5 | 35.828 | 5.18 | 1.51633 | 64.1 |
| 6 | −7.863 | 1.49 | 1.80518 | 25.4 |
| 7 | −10.490 | 10.15–6.14–3.29 | | |
| 8 | −28.665 | 2.64 | 1.80518 | 25.4 |
| 9 | −15.537 | 3.03 | | |
| 10 | −12.410 | 1.50 | 1.83400 | 37.2 |
| 11 | −29.126 | 1.66 | | |
| 12 | −16.209 | 1.50 | 1.83400 | 37.2 |
| 13 | −59.144 | | | |

Second aspheric surface
$a_4 = 0.19804673 \times 10^{-3}$
$a_6 = 0.11076836 \times 10^{-5}$
$a_8 = 0.75126600 \times 10^{-7}$ Shown below are the values that are calculated for conditions (1)–(11) in each of Example 1–6.

| Condition | Ex. 1 | Ex. 2 | Ex. 3 | Ex. 4 | Ex. 5 | Ex. 6 |
|---|---|---|---|---|---|---|
| (1) | −0.232 | −0.271 | 0.0 | −0.184 | −0.260 | −0.359 |
| (2) | −23.5 | −25.9 | −12.0 | −11.7 | −16.9 | −28.8 |
| $\Delta I_{1a}$ | −13.6 | −17.2 | −12.00 | −20.6 | −25.6 | −28.8 |
|  | ($r_3$) | ($r_3$) | ($r_2$) | ($r_2$) | ($r_2$) | ($r_2$) |
|  | −9.9 | −8.7 |  | 8.9 | 8.7 |  |
|  | ($r_4$) | ($r_4$) |  | ($r_4$) | ($r_4$) |  |
| (3) | 0.892 | 0.879 | 0.868 | 0.858 | 0.866 | 0.871 |
| (4) | −0.254 | −0.266 | −0.245 | −0.148 | −0.188 | −0.282 |
| (5) | 0.208 | 0.236 | 0.278 | 0.240 | 0.207 | 0.153 |
| (6) | — | — | 0.0 | 0.192 | 0.135 | — |
| (7) | 0.0032 | 0.0002 | — | 0.0072 | 0.0306 | — |
| (8) | — | — | — | 0.125 | 0.209 | — |
| (9) | 1.585 | 1.585 | 1.805 | 1.805 | 1.585 | 1.805 |
| (10) | 0.292 | 0.299 | 0.484 | 0.528 | 0.442 | 0.545 |
| (11) | 0.283 | 0.305 | — | — | 0.511 | 1.497 |

What is claimed:

1. In a zoom lens system for use with a compact camera having a wide coverage of angles that comprises, in order from the object side, a first lens group having a positive focal length and a second lens group having a negative focal length and which performs zooming by changing the distance between the first and second lens groups, the improvement wherein said first lens group comprises, in order from the object side, a subgroup 1a having a negative focal length and a subgroup 1b having a positive focal length, said subgroup 1a being composed of at least two lens elements including a negative first lens element on the object side and a meniscus lens element on the image side which has a concave surface directed toward the object with a large curvature and a convex surface directed toward the image with a large curvature, and said subgroup 1a further satisfying the following condition:

$$-0.5 < f_{1G}/f_1 \leq 0 \tag{1}$$

where
 $f_{1G}$: the focal length of the first lens group; and
 $f_1$: the focal length of the first lens in subgroup 1a.

2. A zoom lens system according to claim 1 wherein the subgroup 1b in the first lens group is composed of a biconvex lens having a divergent cemented surface and a negative meniscus lens.

3. A zoom lens system according to claim 1 which further satisfies the following conditions:

$$0.7 < h_1/h_{1aMAX} < 1.0 \tag{3}$$

$$-0.5 < f_{1G}/f_{1a} < 0.0 \tag{4}$$

$$0.1 < d_{2-a}/f_s < 0.4 \tag{5}$$

where
 $h_1$: the height of intercept of the first surface in subgroup 1a by paraxial, on-axis rays;
 $h_{1aMAX}$: a maximum value of the height at which paraxial, on-axis rays travel through subgroup 1a;
 $f_{1a}$: the focal length of subgroup 1a;
 $d_{2-a}$: the distance from the second surface of subgroup 1a to the last surface of subgroup 1a; and
 $f_S$: the focal length of the overall system at the wide-angle end.

4. A zoom lens system according to claim 1 wherein the negative first lens on the object side of subgroup 1a is formed of a plastic material, with the following condition being further satisfied:

$$(m_{1a-2} \cdot m_{1b} \cdot m_{2L})^2 < 0.3 \tag{6}$$

where
 $m_{1a-2}$: the lateral magnification of the meniscus lens on the image side of subgroup 1a;
 $m_{1-b}$: the lateral magnification of subgroup 1b; and
 $m_{2L}$: the lateral magnification of the second lens group at the narrow-angle end.

5. A zoom lens system according to claim 1 wherein the meniscus lens on the image side of subgroup 1a is formed of a plastic material, with the following condition being further satisfied:

$$(m_{1b} \cdot m_{2L} - m_{1a-2} \cdot m_{1b} \cdot m_{2L})^2 < 0.3. \tag{7}$$

where
 $m_{1a-2}$: the lateral magnification of the meniscus lens on the image side of subgroup 1a;
 $m_{1-b}$: the lateral magnification of subgroup 1b; and
 $m_{2L}$: the lateral magnification of the second lens group at the narrow-angle end.

6. A zoom lens system according to claim 1 wherein both the negative first lens on the object side of subgroup 1a and the meniscus lens on the image side are formed of a plastic material, with the following condition being further satisfied:

$$(m_{1b} \cdot m_{2L})^2 < 0.3. \tag{8}$$

where
 $m_{1-b}$: the lateral magnification of subgroup 1b; and
 $m_{2L}$: the lateral magnification of the second lens group at the narrow-angle end.

7. A zoom lens system according to claim 1 wherein the second lens group comprises, in order form the object side, a positive meniscus lens 2-1 having a convex surface directed toward the image and a negative meniscus lens 2-2 having a concave surface directed toward the object and further satisfies the following conditions:

$$N_{2G-1} < 1.65 \tag{9}$$

$$0.1 < \frac{|f_{2G}|}{f_{2G-1}} < 0.5 \tag{10}$$

where
 $N_{2G-1}$: the refractive index at the d-line of lens 2-1 in the second lens group;
 $f_{2G}$: the focal length of the second lens group; and
 $f_{2G-1}$: the focal length of lens 2-1 in the second lens group.

8. A zoom lens system according to claim 5 wherein lens 2-1 in the second lens group is formed of a plastic material and satisfies the following condition:

$$(m_{2-2L} - m_{2L})^2 < 0.5 \tag{11}$$

where
 $m_{2-2L}$: the lateral magnification of lens 2-2 in the second lens group at the narrow-angle end.

9. A zoom lens system according to claim 6 wherein lens 2-1 in the second lens group is formed of a plastic material and satisfies the following condition:

$$(m_{2-2L} - m_{2L})^2 < 0.5 \tag{11}$$

where
 $m_{2-2L}$: the lateral magnification of lens 2-2 in the second lens group at the narrow-angle end.

10. A zoom lens system according to claim 1, wherein said subgroup 1a has at least one aspheric surface that has a divergent amount of asphericity with respect to a paraxial radius of curvature in such a way as to satisfy the following condition (2), $$-50 < \Sigma \Delta I_{1a} < 0 \tag{2}$$

where
 $\Sigma \Delta I_{1a}$: the total amount of changes in the coefficient of a third-order spherical aberration caused by the aspheric surfaces in subgroup 1a (i.e., an aberrational coefficient as calculated on the assumption that the focal length of the overall system at the wide-angle end is 1.0).

* * * * *